United States Patent [19]

Cassidy et al.

[11] Patent Number: 5,159,048
[45] Date of Patent: Oct. 27, 1992

[54] ISOCYANATE-REACTIVE COMPOSITIONS

[75] Inventors: Edward F. Cassidy, Chiny; Malcolm Hannaby, Sterrebeek, both of Belgium

[73] Assignee: Imperial Chemical Industries PLC, London, England

[21] Appl. No.: 595,150

[22] Filed: Oct. 10, 1990

[30] Foreign Application Priority Data

Oct. 26, 1989 [GB] United Kingdom ............... 8924127

[51] Int. Cl.$^5$ ............................................. C08G 18/10
[52] U.S. Cl. ...................................... 528/53; 528/68; 528/75; 528/85; 528/229; 521/123; 521/127; 521/164; 560/155
[58] Field of Search ............... 560/155; 528/229, 75, 528/52, 53, 68, 85; 521/164, 167, 123, 127

[56] References Cited

U.S. PATENT DOCUMENTS

| | | | |
|---|---|---|---|
| 3,691,112 | 9/1972 | Grogler et al. | 521/129 |
| 3,865,791 | 2/1975 | Brinkmann et al. | 528/73 |
| 3,941,753 | 3/1976 | Brinkmann et al. | 528/59 |

FOREIGN PATENT DOCUMENTS

| | | |
|---|---|---|
| 1935484 | 1/1971 | Fed. Rep. of Germany . |
| 2125247 | 10/1972 | Fed. Rep. of Germany . |
| 1472274 | 1/1967 | France . |
| 1088300 | 10/1966 | United Kingdom . |

*Primary Examiner*—John Kight, III
*Assistant Examiner*—John M. Cooney, Jr.

[57] ABSTRACT

The invention is concerned with an isocyanate-reactive composition comprising a polymer having a molecular weight of at least 500 containing a plurality of groups of the formula:

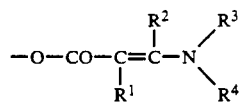

wherein
$R^1$ represents hydrogen or a hydrocarbon radical;
$R^2$ represents a hydrocarbon radical;
$R^3$ represents an organic radical carrying at least one isocyanate-reactive group, and
$R^4$ represents hydrogen or an optionally substituted hydrocarbon radical. Such compositions are useful for making moulded elastomers and flexible foams.

9 Claims, No Drawings

ISOCYANATE-REACTIVE COMPOSITIONS

This invention relates to compositions of matter, including isocyanate-reactive compositions, to their preparation and to their use in the production of useful polymeric materials.

The manufacture of useful polymeric materials by reacting organic polyisocyanates with compounds containing isocyanate-reactive groups is well established. Thus, polyurethane materials, which may take the form of adhesives, coatings, elastomers, fibres, films, foams, thermoplastics and the like are produced on a large scale by reacting polyisocyanates with low and/or high molecular weight polyols. Polyisocyanurate modification may be introduced, especially when making rigid foams, by using a trimerisation catalyst in conjunction with an appropriate excess of polyisocyanate.

Many polyols have been proposed for use in the production of polyurethanes and polyisocyanurates but those most commonly used are the polyoxypropylene polyols obtained by the addition of propylene oxide to suitable initiators. The hydroxyl groups present in polyoxypropylene polyols are predominantly secondary hydroxyls and for some purposes it is desirable to use isocyanate-reactive compounds which have somewhat higher reactivity towards polyisocyanates. In order to enhance the reactivity, it is known to react those polyols with ethylene oxide to replace some of the secondary hydroxyls by primary hydroxyls but, even at high ethylene oxide usage, a significant proportion of secondary hydroxyls remain. It is also known to form polyether polyamines, useful in the production of reaction injection moulded polyurea elastomers, but the polyamines are costly to manufacture. Isocyanate-reactive imino-functional or enamine-containing compounds can be prepared from the polyamines but the cost of the polyamines is again a disincentive.

The present invention is concerned with isocyanate-reactive compositions having high reactivities towards organic polyisocyanates, said compositions being obtainable by reacting low cost starting materials under mild conditions.

Thus, according to the invention, there is provided an isocyanate-reactive composition comprising a polymer having a molecular weight of at least 500 containing a plurality of groups of the formula:

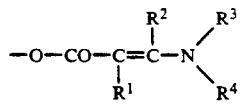
(1)

wherein
$R^1$ represents hydrogen or a hydrocarbon radical;
$R^2$ represents a hydrocarbon radical;
$R^3$ represents an organic radical carrying at least one isocyanate-reactive group, and
$R^4$ represents hydrogen or an optionally substituted hydrocarbon radical.

Hydrocarbon radicals which may be represented by $R^1$ and $R^2$ particularly include $C_{1-1}$ alkyl radicals. Especially important structures include those in which $R^1$ is hydrogen and those in which $R^2$ is methyl.

Organic radicals which may be represented by $R^3$ include hydrocarbon radicals and hydrocarbon radicals containing one or more ether groups, said radicals carrying one or more isocyanate-reactive groups. Typical hydrocarbon radicals include alkyl radicals, for example $C_{1-12}$, especially $C_{1-4}$ alkyl radicals, cycloalkyl radicals, for example cyclohexyl, aralkyl radicals, for example benzyl, and aryl radicals, for example phenyl. Typical hydrocarbon radicals containing one or more ether groups are those selected from the radicals obtained after removal of the hydroxyl groups of mono- and polyoxyalkylene polyols, like of diethylene glycol, dipropylene glycol and polyoxyalkylene polyols having a functionality of 2-6 and preferably of 2-3. Isocyanate-reactive groups which may be present on these radicals include hydroxyl, thiol, primary amino, secondary amino, carboxy, imino and enamino groups. Preferred radicals carry from one to three isocyanate-reactive groups and more preferred radicals carry one or two isocyanate-reactive groups selected from primary hydroxyl, primary amino and secondary amino, enamino and imino. If desired, a radical may contain more than one type of isocyanate-reactive group, for example a primary and a secondary amino group. The isocyanate-reactive groups are preferably attached to aliphatic carbon atoms.

Optionally substituted hydrocarbon radicals which may be represented by $R^4$ include the hydrocarbon radicals mentioned above in relation to $R^3$. Substituents which may optionally be present on these hydrocarbon radicals include the isocyanate-reactive groups mentioned in relation to $R^3$. Thus, $R^4$ may represent an organic radical carrying one or more isocyanate-reactive groups and it may be the same as or different from $R^3$ in structure. Preferably $R_4$ is hydrogen or $C_{1-4}$ alkyl.

The preferred polymers of the invention have the general formula:

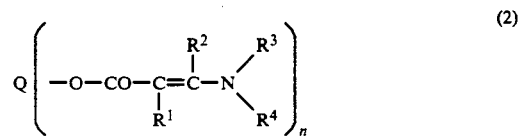
(2)

wherein Q represents the residue remaining after removal of the hydroxyl groups from a polymeric polyol having a molecular weight of at least 400, n is an integer from 2 to 6 and $R^1$, $R^2$, $R^3$ and $R^4$ have the meanings given above.

The residue represented by Q is typically the residue of a polymeric polyol having an average nominal hydroxyl functionality of from 2 to 6 and a number average molecular weight of from 1000 to 10000 especially from 2000 to 8000. In preferred polymers, n is an integer from 2 to 3.

Polymers containing groups of Formula 1 may be prepared by reacting a polymer containing a plurality of groups of the formula:

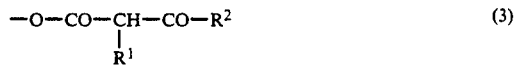
(3)

wherein $R^1$ and $R^2$ have the meanings given above, with at least one mole, per equivalent of group of Formula 3, of an amine of the formula:

$R^3R^4NH$ (4)

wherein $R^3$ and $R^4$ have the meanings given above.

Amines of Formula 4 which may be reacted with polymers containing groups of Formula 3 include amino-alcohols, aminothiols, polyamines, aminocarboxylic acids, amino-imines and amino-enamines.

Preferred amines of Formula 4 include amino-alcohols having a primary or secondary amino group and one or two primary hydroxyls, for example ethanolamine, diethanolamine and polyethers having a primary amino group and one or more primary hydroxyls. Further preferred amines include aliphatic diamines and higher polyamines containing a primary amino group and one or more additional amino groups selected from primary and secondary amino groups, for example ethylene diamine, 1,5-diamine-hexane, N-methyl-1,3-propanediamine, diethylene triamine and triethylene tetramine. Further preferred amines include those comprising one primary or secondary amine group and one or two imine or enamine groups.

Further useful amines of Formula 4 include compounds containing an aliphatic amino group and one or more aromatic amino groups, for example p-aminobenzylamine, and compounds containing an unhindered amino group and one or more sterically hindered amino groups, for example menthane diamine and isophorone diamine.

Mixtures of amines of Formula 4 may be used if desired.

Reaction between the polymer containing groups of Formula 3 and the amine of Formula 4 may be effected at ambient or elevated temperature, optionally in the presence of solvents. When using an amine having two or more groups of equal reactivity, for example ethylene diamine, it is preferred to employ a stoichiometric excess thereof. At the end of the reaction, water formed during the condensation and any excess amine and/or solvent may be removed from the product in a conventional manner.

The polymers containing groups of Formula 3 may themselves be prepared by reacting a polyol having the required molecular weight and hydroxyl functionality with a $\beta$-ketoester of the formula:

(5)

wherein $R^1$ and $R^2$ have the meanings given above and $R^5$ represents a hydrocarbon radical, especially a $C_{1-4}$ alkyl.

A preferred ketoester of Formula 5 is ethyl acetoacetate.

As examples of polymeric polyols which may be used in the preparation of the polymers containing groups of Formula 3 and which provide the aforementioned residue represented by Q in Formula 2, there may be mentioned polyesters, polyesteramides, polythioethers, polycarbonates, polyacetals, polyolefins, polysiloxanes and, especially, polyethers. Suitable polyols have molecular weights of at least 400 and average nominal hydroxyl functionalities of from 2 to 6.

Polyether polyols which may be used include products obtained by the polyaerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water, ammonia, polyols, for example ethylene glycol, propylene glycol, diethylene glycol, cyclohexane dimethanol, resorcinol, bisphenol A, glycerol, trimethylolpropane, 1,2,6-hexanetriol, triethanolamine, pentaerythritol or sorbitol, amines, for example aniline, ethylene diamine, tolylene diamine, diaminodiphenylmethane or polymethylene polyphenylene polyamines and amino-alcohols, for example ethanolamine or diethanolamine. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Random copolymers having oxyethylene contents of 10%–80%, block copolymers having oxyethylene contents of up to 25% and random/block copolymers having oxyethylene contents of up to 50%, based on the total weight of oxyalkylene units may be mentioned. Mixtures of the said diols and triols can be particularly useful. Other particularly useful polyether polyols include polytetramethylene glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, or of hydroxy carboxylic acids such as hydroxy caproic acid, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as b 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and poly(isobutylene) polyols. Suitable polysiloxane polyols include polydimethyl-siloxane diols and triols.

If desired, mixtures of two or more polyols varying in functionality, molecular weight and/or polymer backbone may be used provided such mixtures conform to the average functionality and average molecular weight criteria specified herein.

The reaction between the polymer polyol and the $\beta$-ketoester may be performed under conventional ester interchange conditions. Thus, elevated temperatures, for example 150°–200° C., and ester interchange catalysts, for example tetrabutyl titanate, may be employed. Usually, at least one mole of ketoester will be employed per hydroxyl equivalent although it is within the scope of the invention to use smaller proportions of ketoester to produce polymers containing hydroxyl groups in addition to groups of Formula 1.

Some polymers containing groups of Formula b 1 may be prepared by the chemical modification of polymers containing other groups of Formula 1. Thus, isocyanate-reactive primary or secondary amino groups present in groups of Formula b 1 may be converted to isocyanate-reactive imino or enamino groups by conventional methods, for example by reaction with appropriate carbonyl compounds.

If desired, the isocyanate-reactive compositions of the invention may be blended with other isocyanate-reactive materials which may be of the types which find use as chain extenders or crosslinkers having molecular weights of, for example, from 60 to 1500 or they may be of the types which have been proposed as softblock components having molecular weights of, for example, from 1500 to 8000.

Low molecular weight isocyanate-reactive compounds which may be mixed with the compositions of the invention preferably have molecular weights below 400 and include glycols, for example ethylene glycol and 1,4-butanediol, alkanolamines, for example ethanolamine, diethanolamine, triethanolamine and tri-isopropanolamine and aromatic polyamines. Useful aromatic polyamines particularly include diamines, especially those having molecular weights between 122 and 300. Suitable diamines have been fully described in the prior art and include 3,5-diethyl-2,4-toluenediamine, 3,5-diethyl-2,6-toluenediamine, DBTDA which is a mixture of about 80% by weight of 3,5-diethyl-2,4-toluenediamine and about 20% by weight of 3,5-diethyl-2,6-toluenediamine, 1,3,5-triethyl-2,6-diaminobenzene, 2,4-diaminotoluene, 2,6-diaminotoluene, 2,4'-diaminodiphenylmethane, 4,4'-diamino-diphenylmethane, 3,3'-dimethyl-5,5'-diethyl-4,4'-diamino-diphenylmethane, 3,3', 5,5'-tetraisopropyl-4,4'-diamino-diphenylmethane and the like and mixtures thereof.

Higher molecular weight isocyanate-reactive compounds which may be mixed with the compositions of the invention include polymeric polyols, for example those described above with reference to the production of polymers containing groups of Formula 3, especially the polyether and polyester polyols. Other higher molecular weight isocyanate-reactive compounds useful for mixing with the compositions of the invention include polymeric polyamines, especially diamines and triamines, corresponding to the above described polymeric polyols. Suitable polyamines include products obtained by the reductive amination of polyether polyols as described, for example, in U.S. Pat. No. 3,654,370 or by the cyanoethylation of polyols followed by hydrogenation. Polyoxypropylene diamines and triamines and mixtures thereof are preferred. Also useful are polymers containing both amino and hydroxyl groups obtained by the partial amination of polyols.

Other isocyanate-reactive materials which may be mixed with the compositions of the invention to form useful isocyanate-reactive blends include low or high molecular weight imino- or enamino-functional materials.

The isocyanate-reactive compositions and blends of the invention may be reacted with organic polyisocyanates using techniques and items of processing equipment that have been fully described in the prior art to form useful polymeric materials, for example polyurethanes or polyureas which may take any of the known forms, for example adhesives, coatings, elastomers, fibres, films, foams or thermoplastics. Furthermore, polyisocyanurate modification may be introduced into said polymers by appropriate use of excess polyisocyanate and trimerisation catalysts.

Organic polyisocyanates which may react with the isocyanate-reactive compositions and blends of the invention include aliphatic, cycloaliphatic and araliphatic polyisocyanates, for example hexamethylene diisocyanate, isophorone diisocyanate, cyclohexane-1,4-diisocyanate, dicyclohexylmethane-4,4'-diisocyanate and p-xylylene diisocyanate. The preferred polyisocyanates, however, are the aromatic polyisocyanates, for example phenylene diisocyanates, tolylene diisocyanates, 1,5-naphthylene diisocyanate and especially the available MDI isomers, that is to say 4,4'-diphenylmethane diisocyanate, 2,4'-diphenylmethane diisocyanate and mixtures thereof.

Whilst diisocyanates are the preferred polyisocyanates for most purposes, for example for the preparation of elastomers, mixtures of diisocyanates with higher functionality polyisocyanates may be used if desired. Such mixtures include polymethylene polyphenyl polyisocyanates (Polymeric MDI). Mention may also be made of polyisocyanates (especially MDI) which have been modified by the introduction of urethane, allophanate, urea, biuret, carbodiimide, uretonimine or isocyanurate residues.

Reaction between the organic polyisocyanate and the composition or blend of the invention may be performed in the presence of reactive or non-reactive additives already described for use in polyurethane, polyurea or polyisocyanurate processes. In addition to the chain extenders, cross-linkers and the like already mentioned, such additives include blowing agents, catalysts, surfactants, foam stabilisers, cell openers, fire retardants, fillers, dyes, pigments and internal mould release agents.

Blowing agents which may be used include water and inert volatile liquids which vaporise under the influence of the exothermic reaction, such liquids typically having boiling points not exceeding 100° C., preferably not exceeding 50° C., at atmospheric pressure.

Catalysts which may be used include tertiary amines such as 1,4-diazabicyclo(2,2,2)octane. N,N-dimethylethanolamine, bis(2-dimethylaminoethyl) ether, N-ethylmorpholine and N,N'-diethylpiperazine and tin compounds such as stannous octoate and dibutyltin dilaurate. Trimerisation catalysts include alkali metal salts of lower alkanoic acids and certain tertiary amines such as tris(dialkylaminoalkyl)-hexahydrotriazines and tris(-dialkylaminoalkyl)phenols.

Surfactants and foam stabilisers which may be used include oxyethylated alkylphenols, ethylene oxide-propylene oxide block copolymers and siloxane-oxyalkylene copolymers.

Fire retardants may be of the isocyanate-reactive or non-reactive types and fillers may be organic or inorganic, particulate or fibrous.

In formulating reaction systems comprising:
A) an organic polyisocyanate;
B) an isocyanate-reactive component comprising an isocyanate-reactive composition or blend of the invention, and C) one or more of the additives known per se in polyurethane, polyurea or polyisocyanurate processes, some of the individual components may be pre-blended if desired so as to reduce the number of component streams requiring to be brought together in the final mixing step. It is generally most convenient to formulate a two-stream system whereby one stream comprises the polyisocyanate and the second stream comprises the isocyanate-reactive materials. Inert additives are commonly included in the isocyanate-reactive stream but can often be incorporated with the polyisocyanate.

The isocyanate-reactive compositions of the invention can be of particular value in the production of moulded elastomers by the reaction injection moulding (RIM) technique whereby a polyisocyanate stream and an isocyanate-reactive stream are impingement mixed and rapidly injected into a mould cavity. The isocyanate-reactive stream advantageously contains an aromatic polyamine, for example the diamines mentioned above, as chain extender in addition to an isocyanate-reactive composition of the invention.

For use in RIM processes, the isocyanate-reactive compositions of the invention preferably have amino, imino or enamino end groups.

Compositions of the invention in which the groups of Formula 1 contain hydroxyl groups, especially primary hydroxyls, are of particular value in the production of flexible polyurethane foams. Conventional foam-making techniques may be employed but the compositions are of particular interest in water-blown formulations which are substantially free of undesirable halocarbon blowing agents.

If desired, the isocyanate-reactive compositions of the invention may be reacted with an excess of organic polyisocyanate, for example MDI, to form polyisocyanate compositions (prepolymers) which may then be used in known manner in RIM, flexible foam or other processes.

The invention is illustrated but not limited by the following Examples.

EXAMPLE 1

Preparation of poly(oxypropylene) acetoacetate of functionality 3

A 10 l round bottomed flask in a temperature controlled heating mantle was fitted with a mechanical stirrer, a nitrogen sparge and a vigreux column with Liebig condenser. The flask was charged with 9000 g of a 5000 molecular weight poly(oxypropylene)triol based on glycerol, 782 g of ethylacetoacetate and 3 ml of tetrabutyltitanate catalyst. The reaction mixture was heated to 160°-170° C. with a gentle sparge of nitrogen. The progress of reaction was monitored by infrared analysis of the condensed volatiles produced during the reaction. After 440 minutes, a further 500 g of ethylacetoacetate and 2 ml of tetrabutyltitanate were added to the reaction mixture. After 690 minutes, a sample of distillate contained mainly ethanol as indicated by a peak at 3350 cm$^{-1}$ in the infrared spectrum of the sample. After 810 minutes, the vigreux column was removed and heating was continued. Analysis of the distillate at this point showed this material to be mainly ethylacetoacetate. The excess ethylacetoacetate was then removed by the application of vacuum.

After all of the volatile components had been removed, the product was shown to have a hydroxyl value of 3.5 mg KOH/g indicating greater than 90% conversion to the poly(oxypropylene) acetoacetate.

EXAMPLE 2

Preparation of a poly(oxypropylene)-N-(2-hydroxyethyl) aminocrotonate of hydroxyl functionality 3

A 10 l round-bottomed flask fitted with a mechanical stirrer was charged with 152,3 g of monoethanolamine and 4600 g of the poly(propyleneoxide)acetoacetate described in Example 1. The reaction mixture was stirred until it was considered to be homogeneous and was then left to stand for a period of sixteen hours. After this time, analysis by infrared (IR) and nuclear magnetic resonance (NMR) spectroscopy indicated that the desired hydroxyl-functionalized aminocrotanoate had formed. The product, which showed an amine value of 0.053 mmol/g, an hydroxyl value of 55.9 mgKOH/g and a water content of 0.9% was used directly, without further purification, or was stripped at 50° C. and 1-3 mmHg to a water content of <0.1%. Flexible foams were made by combining 100 parts of the compound so obtained with 0.1 parts of Niax Al catalyst, 1.0 part of Dabco 33 LV catalyst, 0.75 parts of B 4113 surfactant, 3.9 parts of water and, respectively, 7.0 parts and no Arcton 11 and by reacting theses combinations at an index of 100 with Suprasec VM 25 polyisocyanate. Both foams had a free rise density below 55 Kg/m$^3$.

EXAMPLE 3

Preparation of a poly(oxypropylene)-N-(2-aminoethyl) aminocrotonate of amine functionality 3

A 500 ml pear-shaped flask was charged with 24,3 g of ethylenediamine and 237 g of the poly(propyleneoxide) acetoacetate described in Example 1. The reaction mixture was mixed until it was considered to be homogeneous and was then left to stand for a period of sixteen hours. After this time, the excess ethylenediamine was removed by distillation under reduced pressure at 45° C. and 1-3 mmHg. Analysis by infrared (IR) and nuclear magnetic resonance (NMR) spectroscopy indicated that the desired amino-functionalized aminocrotonate had formed. The product, which showed an amine value of 1.266 mmol/g and contained a small amount of ethylenediamine impurity, was used directly, without further purification.

EXAMPLE 4

Preparation of a poly(oxypropylene)-N-(N'-methyl 3 aminopropyl) aminocrotonate of secondary amine functionality 3

A 10 l round-bottomed flask fitted with a mechanical stirrer was charged with 233.1 g of N-methylpropanediamine and 4864 g of the poly(propyleneoxide)acetoacetate described in example 1. The reaction mixture was stirred until it was considered to be homogenous and was then left to stand for a period of sixteen hours. After this time, the flask was attached to a vacuum pump via a cold-trap and was heated at 50° C. under reduced pressure to remove the water formed during the condensation reaction. Analysis by infrared (IR) and nuclear magnetic resonance (NMR) spectroscopy indicated that the desired functionalized aminocrotonate had formed. The product, which showed an amine value of 0.53 mmol/g, a water content of <0.1%, and a residual N-methylpropanediamine content of <0.1%, was used directly, without further purification.

A prepolymer, having an isocyanate content of 15.48%, was prepared by reacting 44.3 parts of an 80/20 mixture of 4,4'- and 2,4'-diphenylmethane diisocyanates with 22.9 parts of a poly(propylene oxide) triol having a molecular weight of 5000 and 22.9 parts of a poly(propylene oxide) diamine of molecular weight 2000. 10.0 parts of a uretonimine-modified diphenylmethane diisocyanate, having an isocyanate content of 29.1% was stirred into this prepolymer after preparation.

Elastomers were prepared by reacting a "B"-component consisting of 20.6 parts of a poly(oxypropylene)-N-(N'-methyl-3-aminopropyl) aminocrotonate, as described in this example, and 16.88 parts of an 80/20 mixture of 2,4- and 2,6-diethyltoluene diamines (DETDA), with 62.48 parts of the prepolymer described in this example.

The elastomers were prepared using the Reaction Injection Moulding (RIM) process; the machine used was a BATTENFELD SHK-65 RIM dispensing unit. A steel test plaque mould of the dimensions 30 cm (length)×30 cm (width)×3 mm (thickness), which was maintained at a temperature of 90°-95° C., was used to prepare the elastomers.

In the physical properties of the elastomers prepared are given in Table I.

TABLE 1
PHYSICAL PROPERTIES OF ELASTOMERS

| PROPERTY | TEST METHOD | VALUE |
|---|---|---|
| DENSITY (Kg/m$^3$) | DIN 53420 | 1165 |
| HARDNESS (SHORE D) | DIN 53505 | 65 |
| FLEXURAL MODULUS (MPa) | ASTM D 790 | 550 |
| TENSILE STRENGTH (MPa) | DIN 53504 | 27 |
| ELONGATION (%) | DIN 53504 | 95 |
| COEFFICIENT LINEAR THERMAL EXPANSION, CLTE ($\alpha \cdot 10^{-6}/°C$.) | $-30°$ C. to $+70°$ C. | 135 |
| HEAT SAG (mm) [150 mm O/H, 160° C., 60 min.] | ASTM D3769-85 | 7 |
| FALLING DART IMPACT (J) | ASTM D 4272 | |
| +20° C. | | 81 |
| −20° C. | | 34 |

EXAMPLE 5

Preparation of an aminocrotonate with imine functionality 3

24.7 g of 2-methyl-1,5-diaminopentane was mixed with 75 g of cyclohexanone and subsequently the mixture was stirred for 15 min. at 20° C. Then, 300 g of the tris-acetoacetate of LHT-42 (a trifunctional polyol having an equivalent molecular weight of about 1340 and commercially available from Union Carbide) was added dropwise in about 1.5 hours at 20° C. under nitrogen. Water and excess cyclohexanone were removed at 50° C. under vacuum. Analysis indicated that the desired product was obtained.

We claim:

1. An isocyanate-reactive composition comprising a polymer having a molecular weight of at least 500 prepared from a polymeric polyol and containing a plurality of groups of the formula:

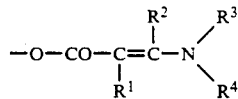

wherein
R$^1$ represents hydrogen or a hydrocarbon radical;
R$^2$ represents a hydrocarbon radical;
R$^3$ represents an organic radical carrying at least one isocyanate-reactive group, and
R$^4$ represents hydrogen or an optionally substituted hydrocarbon radical.

2. A composition according to claim 1 wherein R$^1$ is hydrogen.

3. A composition according to claim 1 wherein R$^2$ is methyl.

4. A composition according to claim 1 wherein R$^3$ is an hydrocarbon radical or an hydrocarbon radical containing one or more ether groups said radical carrying from one to three isocyanate-reactive groups selected from primary hydroxyl, primary amino, secondary amino, imino and enamino.

5. A composition according to claim 1 wherein R$^4$ is hydrogen or C$_{1-4}$ alkyl.

6. A composition according to claim 1 wherein the polymer has the general formula:

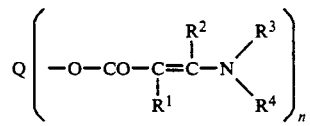

wherein Q represents the residue remaining after removal of the hydroxyl groups from a polymeric polyol having a molecular weight of at least 400, n is an integer from 2 to 6 and R$^1$, R$^2$, R$^3$ and R$^4$ have the meanings given in claim 1.

7. A composition according to claim 6 wherein the polyol has a number average molecular weight of from 2000 to 8000 and is a polyoxyalkylene diol or triol.

8. A method for the preparation of a polymer as defined in claim 1 which comprises reacting a polymer containing a plurality of groups of the formula:

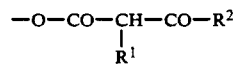

wherein R$^1$ and R$^2$ have the meanings given in claim 1, with at least one mole, per equivalent of said group, of an amine of the formula:

wherein R$^3$ and R$^4$ have the meanings given in claim 1.

9. A reaction system for use in making a polymeric material, said system comprising the following ingredients:
A) an organic polyisocyanate
B) an isocyanate-reactive component comprising an isocyanate-reactive composition according to claim 1, and
C) one or more conventional additives for polyurethane, polyurea or polyisocyanurate processes.

* * * * *